US012655904B2

(12) United States Patent
Chen et al.

(10) Patent No.: US 12,655,904 B2
(45) Date of Patent: Jun. 16, 2026

(54) PARKING DEVICE AND PARKING SYSTEM OF AUTOMOBILE, AND AUTOMOBILE

(71) Applicant: Jing-Jin Electric Technologies Co., Ltd., Beijing (CN)

(72) Inventors: Zhengguang Chen, Beijing (CN); Jianwen Li, Beijing (CN); Ting Zhang, Beijing (CN); Jianjun Zhang, Beijing (CN); Yinzhe Zhang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 18/876,966

(22) PCT Filed: Jun. 7, 2023

(86) PCT No.: PCT/CN2023/098939
§ 371 (c)(1),
(2) Date: Dec. 19, 2024

(87) PCT Pub. No.: WO2024/060691
PCT Pub. Date: Mar. 28, 2024

(65) Prior Publication Data
US 2025/0389328 A1 Dec. 25, 2025

(30) Foreign Application Priority Data
Sep. 22, 2022 (CN) .......................... 202211159970.7

(51) Int. Cl.
*F16H 63/34* (2006.01)
(52) U.S. Cl.
CPC ................................ *F16H 63/3433* (2013.01)
(58) Field of Classification Search
CPC .......................................... F16H 63/34–3433
See application file for complete search history.

(56) References Cited

U.S. PATENT DOCUMENTS

| 11,585,438 B2 * | 2/2023 | Morise ................... B60T 1/005 |
| 2019/0049005 A1 * | 2/2019 | Clark ................. F16H 63/3425 |

(Continued)

FOREIGN PATENT DOCUMENTS

| CN | 110953341 | 4/2020 |
| CN | 111237453 | 6/2020 |

(Continued)

OTHER PUBLICATIONS

International Search Report (in Chinese and with translation) for PCT/CN2023/098939, dated Aug. 29, 2023, 5 pages.

(Continued)

*Primary Examiner* — Ernesto A Suarez
*Assistant Examiner* — Lillian T Nguyen
(74) *Attorney, Agent, or Firm* — Tucker Ellis LLP

(57) ABSTRACT

A parking device of a vehicle is disclosed. The parking device comprises a parking gear, a position limiting member, a parking pawl, a push rod assembly, a swinging drive member and a position restoring member. The position limiting member is spaced from a circumferential side surface of the parking gear. The parking pawl is provided in the vehicle in a way that it is rotatable, and an engagement end of the parking pawl is located between the position limiting member and the parking gear, and is rotatable to a parking position where it is engaged with the parking gear. The push rod is provided with a pushing part that can abut between the parking pawl and the position limiting member. The push block is slidably provided on the push rod. An elastic member is connected between the pushing part and the push block. A swinging drive member can swing back and forth. A swinging end of the swinging drive member can be hinged to the push block to push or pull, via the push block, the pushing part to move by means of the elastic member. By pushing the pushing part the parking pawl can (Continued)

be driven to rotate so that the engagement end is rotated to the parking position. The position restoring member can provide a position restoring force to the parking pawl, so that the engagement end can be disengaged from the parking position after the pushing part is pulled.

13 Claims, 9 Drawing Sheets

(56)                References Cited

U.S. PATENT DOCUMENTS

| | | | |
|---|---|---|---|
| 2019/0136973 A1 | 5/2019 | Rost et al. | |
| 2020/0032902 A1 | 1/2020 | Neelakantan et al. | |
| 2021/0396310 A1* | 12/2021 | Kraemer | F16H 63/3416 |
| 2023/0020347 A1 | 1/2023 | Li et al. | |
| 2023/0049064 A1 | 2/2023 | Hou et al. | |

FOREIGN PATENT DOCUMENTS

| | | | | |
|---|---|---|---|---|
| CN | 212106898 | | 12/2020 | |
| CN | 112969872 | A | 6/2021 | |
| CN | 113404858 | A | 9/2021 | |
| CN | 113685543 | | 11/2021 | |
| CN | 113685543 | A * | 11/2021 | F16H 63/3433 |
| CN | 115507178 | | 12/2022 | |
| CN | 218523024 | | 2/2023 | |
| CN | 218523024 | U | 2/2023 | |
| DE | 10144056 | | 3/2003 | |
| DE | 10144056 | B4 * | 9/2005 | F16H 63/3425 |
| DE | 102012012673 | A1 | 12/2013 | |
| DE | 102019113390 | B4 | 12/2021 | |
| DE | 102020122237 | A1 | 12/2021 | |
| EP | 3472497 | B1 | 1/2020 | |
| JP | 2006322489 | | 11/2006 | |
| JP | 2008128470 | | 6/2008 | |
| JP | 2011011579 | | 1/2009 | |
| JP | 2022066707 | A * | 5/2022 | |
| WO | 2020103975 | A1 | 5/2020 | |

OTHER PUBLICATIONS

Office Action issued in Chinese Patent Application No. 202211159970. 7, dated May 17, 2025, 22 pages (with translation).

European search report in counterpart EP 23866987.3, dated Jul. 24, 2025, 5 pages.

Office action issued in Japanese patent application 2025-517454, dated Feb. 27, 2026, 10 pages total (including translation).

* cited by examiner

PARKING DEVICE AND PARKING SYSTEM OF AUTOMOBILE, AND AUTOMOBILE

CROSS-REFERENCE TO RELATED APPLICATIONS

This application claims priority to Chinese patent application No. 202211159970.7 filed with the Chinese Patent Office on Sep. 22, 2022 and entitled "A Parking Device of A Vehicle, A Parking System and A Vehicle", which is incorporated by reference herein in its entirety.

TECHNICAL FIELD

The present disclosure relates to the field of vehicles, and in particular to a parking device of a vehicle. The present disclosure also relates to a parking system and a vehicle having the parking device.

BACKGROUND

When a vehicle encounters traffic jams or goes up and down hills in driving, it needs to start and stop frequently. In this case, the use of foot brake will lead to the fatigue of driver and the possibility of slipping, and the use of hand brake will increase the starting response time and also the possibility of slipping. The use of parking device can effectively prevent the vehicle from slipping on congested roads or up and down hills, and can keep the vehicle in stationary and parked states for a long time. However, the existing parking devices are poor in durability and stability.

SUMMARY

In view of the above problems, the present disclosure discloses a parking device of a vehicle to overcome or at least partially solve the above problems.

The present disclosure also discloses a parking system having the parking device.

The present disclosure also discloses a vehicle having the parking system.

In order to achieve the above object, the present disclosure adopts the following technical solutions.

The present disclosure provides a parking device of a vehicle, which comprises: a parking gear, a position limiting member, a parking pawl, a push rod assembly, a swinging drive member and a position restoring member. The parking gear is linked to a transmission system of the vehicle. The position limiting member is fixedly provided in the vehicle and is spaced from a circumferential side surface of the parking gear. The parking pawl is provided in the vehicle in a way that it is rotatable around a fixed axis, and an engagement end of the parking pawl is located between the position limiting member and the parking gear, and is rotatable to a parking position where it is engaged with the parking gear. The push rod assembly comprises a push rod, a push block and an elastic member. The push rod is provided with a pushing part that can abut between the parking pawl and the position limiting member. The push block is slidably provided on the push rod. The elastic member is connected between the pushing part and the push block. The swinging drive member can swing back and forth around a swinging axis. A swinging end of the swinging drive member can be hinged to the push block to push or pull, via the push block, the pushing part to move by means of the elastic member. By pushing the pushing part the parking pawl can be driven so that the engagement end is rotated to the parking position. The position restoring member can provide a position restoring force to the parking pawl, so that the engagement end can be disengaged from the parking position after the pushing part is pulled.

The parking device of a vehicle has a simple structure. It cleverly utilizes the cooperation among components to drive the push rod by using a swinging drive method. It occupies a small space and has a compact structure. It can ensure the accuracy of the parking operation, good durability, and high stability.

In an exemplary embodiment of the parking device of a vehicle, the pushing part comprises a push bracket, and a first roller and a second roller that are rotatably provided on the push bracket, the first roller is capable of abutting against the position limiting member, and the second roller is capable of abutting against the parking pawl. The roller design can effectively reduce the wear loss of parts during the transmission process and make the entire transmission action smoother.

In an exemplary embodiment of the parking device of a vehicle, the position limiting member is provided with two first limiting parts that are provided with an interval. The pushing bracket is provided with a second limiting part, the second limiting part is capable of being located between the two first limiting parts and is capable of abutting against either of the first limiting parts along a moving direction after moving with the pushing bracket. The first limiting parts and the second limiting part can effectively limit the positional relationship between the pushing part and the limiting member, so that the overall structure is more stable.

In an exemplary embodiment of the parking device of a vehicle, the elastic member is a spring sleeved on the push rod.

In an exemplary embodiment of the parking device of a vehicle, the push block is a sliding sleeve sleeved on the push rod, and an outer surface of the push block is provided with a pair of hinged parts that are provided on opposite sides. The swinging drive member comprises a pair of swinging parts that are provided with an interval, and a swinging end of each of the pair of swinging parts can be hinged to the push block through one of the hinged parts.

In an exemplary embodiment of the parking device of a vehicle, the push rod is further provided with an unlocking part. The parking device further comprises a manual pull rod, the manual pull rod is provided with a pulling part, and the manual pull rod can pull the unlocking part through the pulling part to pull the pushing part. The manual pull rod can be extended into the cab, so that the driver can manually unlock the parking state by pulling the manual pull rod when the vehicle has a parking failure.

The present disclosure also provides a parking system of a vehicle, which comprises the parking device as stated above and a rotation drive device. The rotation drive device is capable of providing a driving force for the swinging drive member.

In an exemplary embodiment of the parking system of a vehicle, the parking system further comprises: a rotating position sensor disposed in the rotation drive device; and a pawl position sensor for detecting a position of the parking pawl. By providing the two position sensors, the current work state of the parking device can be accurately obtained to improve the safety level.

The present disclosure also provides a vehicle having the parking system as stated above.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
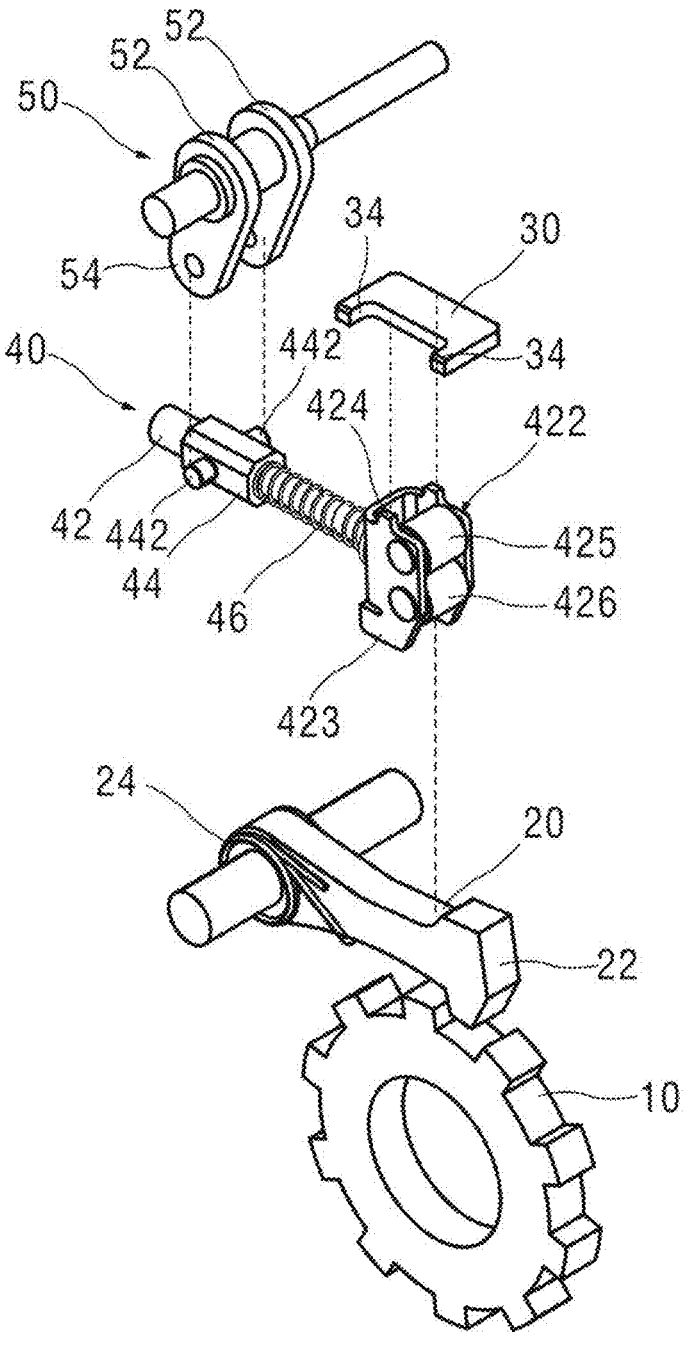
FIG. 1 is a schematic diagram for illustrating the exploded structure of a parking device of a vehicle according to an exemplary embodiment.

In the drawings: 10, parking gear; 20, parking pawl; 22, engagement end; 24, position restoring member; 30, position limiting member; 34, first limiting part; 40, push rod assembly; 42, push rod; 422, pushing part; 423, push bracket; 424, second limiting part; 425, first roller; 426, second roller; 44, push block; 442, hinged part; 46, elastic member; 48, unlocking part; 50, swinging drive member; 52 swinging part; 54, swinging end; 60, pawl position sensor; 70, rotation drive device; 80, manual pull rod; 88, pulling part.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

Herein, "schematic" means "serving as an example, case or illustration", and any diagram or implementation described as "schematic" herein should not be interpreted as a more preferred or more advantageous technical solution.

In order to make the drawings simple and concise, only the relevant parts of the present disclosure are schematically shown in each drawing, and they do not represent the actual structure of the product. In addition, in order to make the drawings simple, concise and easy to understand, in some drawings, only one of the components having the same structure or function is schematically drawn or marked.

The technical solutions provided by various embodiments of the present disclosure will be described in detail with reference to the accompanying drawings.

Figure 2:
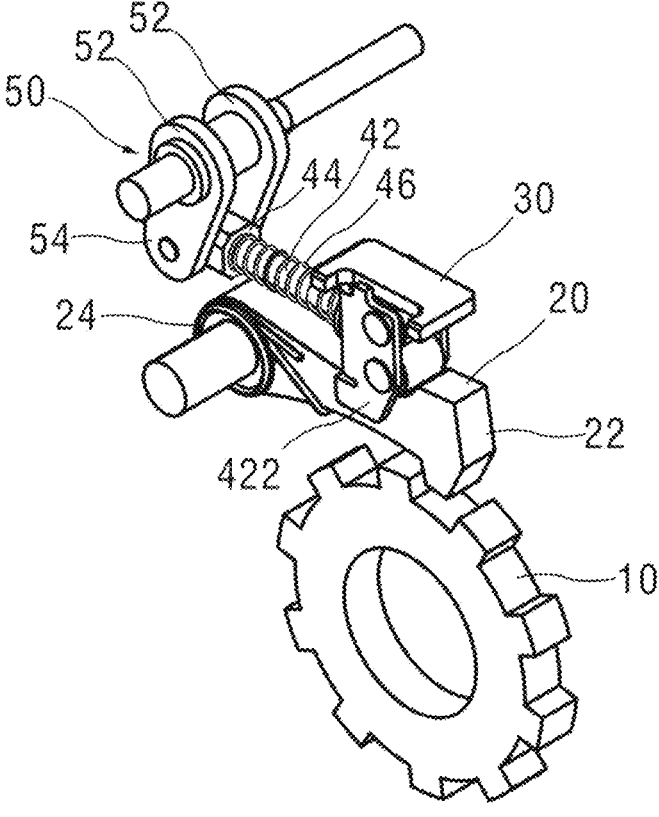
FIG. 2 is a schematic diagram for illustrating the structure of the parking device of a vehicle shown in FIG. 1 in an assembled state.

FIG. 1 is a schematic diagram for illustrating the exploded structure of a parking device of a vehicle according to an exemplary embodiment. FIG. 2 is a schematic diagram for illustrating the structure of the parking device of a vehicle shown in FIG. 1 in an assembled state. As shown in FIGS. 1 and 2, the parking device of a vehicle comprises a parking gear 10, a parking pawl 20, a position restoring member 24, a position limiting member 30, a push rod assembly 40 and a swinging drive member 50.

Among them, the parking gear 10 is linked to the transmission system such as a gearbox in the vehicle, and the parking gear 10 will move synchronously with the transmission system in the vehicle, so once the parking gear 10 is locked, the transmission system of the vehicle is also locked and enters the parking state.

The position limiting member 30 is provided at a fixed position in the vehicle. The position limiting member 30 provided at the fixed position is spaced from a circumferential side surface of the parking gear 10. The circumferential side surface of the parking gear 10 is the side surface of the parking gear 10 having teeth. Since the rotating shaft of the parking gear 10 is relatively fixed, there is a fixed interval between the fixedly provided position limiting member 30 and the parking gear 10, thereby defining an assembly space, as shown in FIG. 2.

The parking pawl 20 is provided in the vehicle in a way that it is rotatable around a fixed axis, and an engagement end 22 of the parking pawl 20 is located in the assembly space defined between the position limiting member 30 and the parking gear 10. When the engagement end 22 of the parking pawl 20 rotates around the fixed axis to a parking position, the engagement end 22 can engage with the parking gear 10, thereby locking the parking gear 10 and achieving parking.

The position restoring member 24 can act on the parking pawl 20 and provide a position restoring force to the parking pawl 20. The position restoring force can drive the parking pawl 20 to rotate so that the engagement end 22 is disengaged from the parking position. The specific process will be described in detail later. In the embodiment shown in the drawing, the position restoring member 24 is a torsion spring.

The push rod assembly 40 comprises a push rod 42, a push block 44 and an elastic member 46. The push rod 42 is provided with a pushing part 422, and the pushing part 422 can abut between the parking pawl 20 and the position limiting member 30. Namely, as shown in FIG. 2, the pushing part 422 of the push rod 42 and the parking pawl 20 are both provided in the assembly space defined between the position limiting member 30 and the parking gear 10, in the order of the position limiting member 30, the pushing part 422, the parking pawl 20 and the parking gear 10.

The push block 44 of the push rod assembly 40 can be slidably provided on the push rod 42, and the elastic member 46 is connected between the pushing part 422 of the push rod 42 and the push block 44. Therefore, if the push block 44 moves, the push block 44 will first act on the pushing part 422 through the elastic member 46. If it cannot directly drive the pushing part 422 to move, the push block 44 will move relative to the push rod 42. In the embodiment shown in the drawing, the elastic member 46 is a spring sleeved on the push rod 42.

The swinging drive member 50 can swing back and forth around a swinging axis, and a swinging end 54 of the swinging drive member 50 can be hinged to the push block 44 to form a power mechanism of the push rod assembly 40. During the swinging process of the swinging end 54 of the swinging drive member 50, the push block 44 will be driven to move. As stated above, the movement of the push block 44 will act on the pushing part 422 of the push rod 42 through the elastic member 46, thereby driving the pushing part 422 to move.

Figure 3:
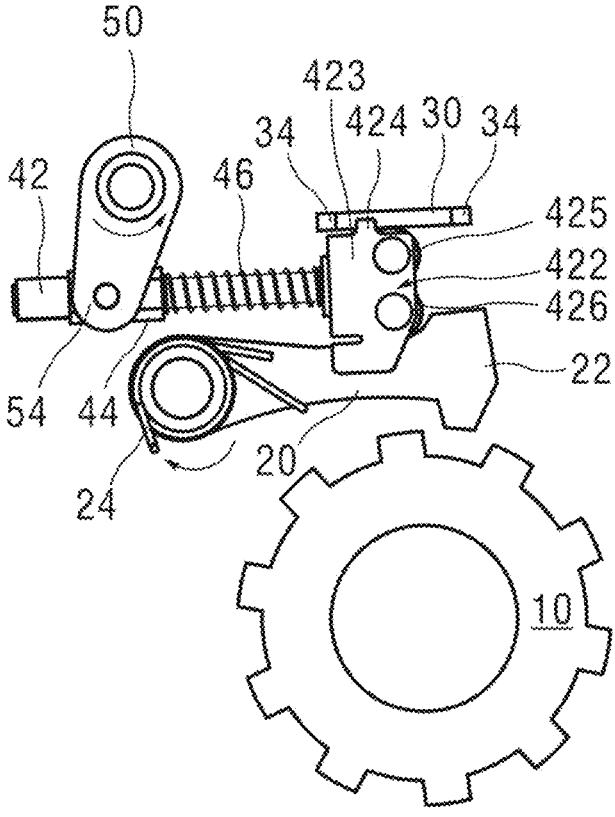
FIGS. 3 to 5 are schematic diagrams for illustrating the working state of the parking device of a vehicle.
Figure 4:
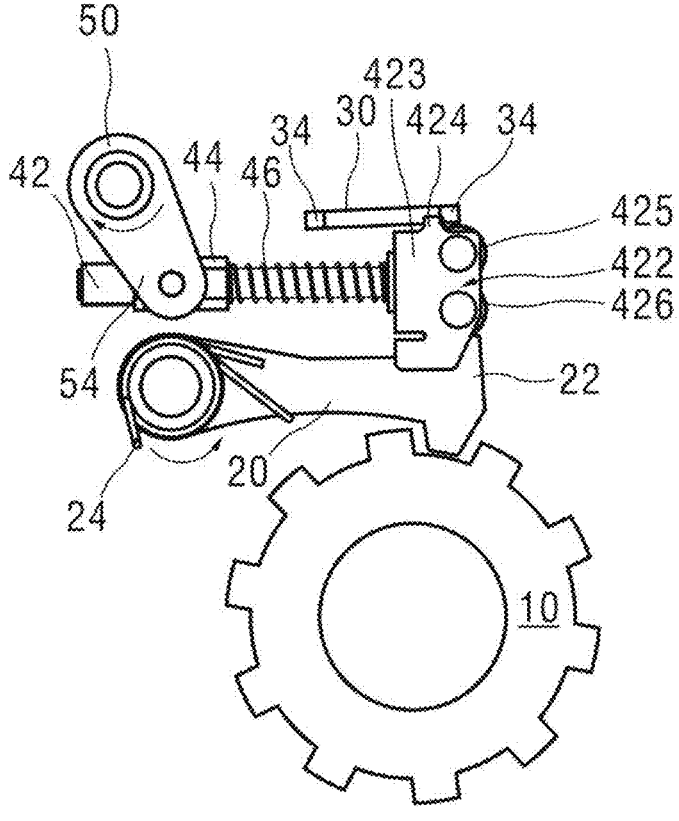
Figure 5:
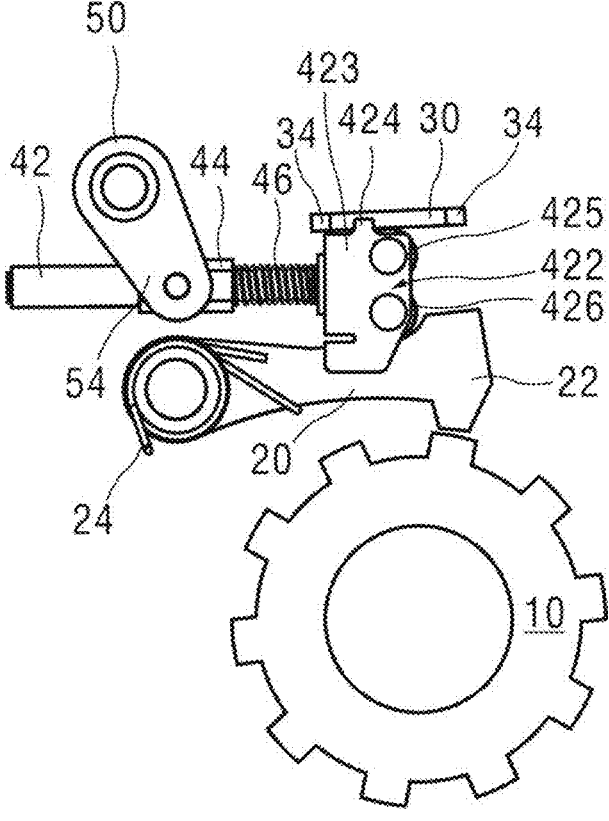

For the specific working process, please refer to FIGS. 3 to 5.

As shown in FIG. 3, at this moment, the parking device of a vehicle is in a standby state, and the parking gear 10 itself can rotate with the transmission system of the vehicle. At this moment, the position restoring member 24 can provide a position restoring force to the parking pawl 20, so that the parking pawl 20 remains disengaged from the parking position.

Figure 9:
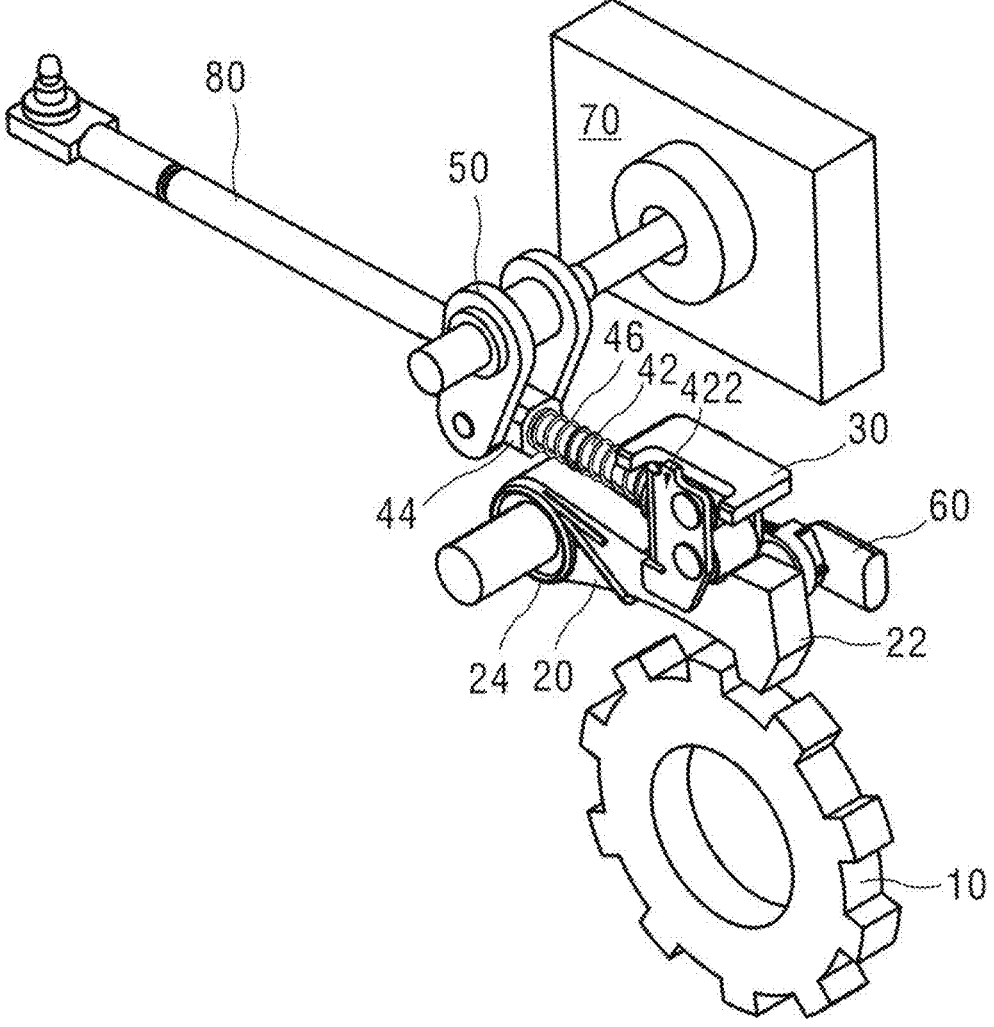
FIG. 9 is a schematic diagram for illustrating the structure of a parking system of a vehicle according to an exemplary embodiment.

When the vehicle needs to park, a rotation drive device 70 is triggered (see FIG. 9). The rotation drive device 70 will drive the swinging drive member 50 to start swinging in the counterclockwise direction as indicated by the arrow in the drawing. The swinging drive member 50 will drive the push block 44 to move to the right. The push block 44 moves with the swinging drive member 50, so it completes a swinging action to the right instead of a linear action. The swinging of the push block 44 to the right will act on the pushing part 422 of the push rod 42 by means of the elastic member 46. The pushing part 422 will move to the right under the drive of the elastic member 46, and use the contact between the pushing part 422 and the parking pawl 20 to overcome the position restoring force of the position restoring member 24 and thus push the parking pawl 20 to rotate in the clockwise direction as indicated by the arrow in the drawing.

The pushing action of the pushing part 422 on the parking pawl 20 is the result of cooperation of several components.

First, it can be known from the above description and the accompanying drawings that the combination (the combination here means that the parts are combined with each other and cannot be separated) of the push rod 42 with the swinging drive member 50 is achieved only through the elastic member 46 and the push block 44. Since the push block 44 is hinged to the swinging drive member 50, the pushing part 422 of the push rod 42 itself can be in a free state of rotating around the hinge axis. On the other hand, the restriction on the pushing part 422 is achieved by the parking pawl 20 under the action of the position restoring member 24 and the position limiting member 30 fixed in the vehicle. Through the contact of the pushing part 422 with the parking pawl 20 and the position limiting member 30, not only the restriction and positioning limiting on the pushing part 422 is completed, but the moving trajectory of the pushing part 422 is also cleverly restricted.

Second, the pushing part 422 uses the restricted moving trajectory to maintain contact with the parking pawl 20, and then uses the shape design of the contact surface between the pushing part 422 and the parking pawl 20 to achieve the pushing effect of the pushing part 422 on the parking pawl 20 during the movement along its moving trajectory.

When the pushing part 422 moves along its moving trajectory and pushes the parking pawl 20 to rotate to a parking position, as shown in FIG. 4, the engagement part 22 of the parking pawl 20 engages with the parking gear 10 to stop the parking gear 10 and the transmission structure in the vehicle from continuing to rotate. In this way, the parking is achieved.

If the parking state is to be released, the rotation drive device 70 is triggered (see FIG. 9), the rotation drive device 70 drives the swinging drive member 50 to start swinging in the clockwise direction indicated by the arrow in FIG. 4, and the swinging drive member 50 drives the push block 44 to swing to the left. The swinging of the push block 44 to the left will pull the pushing part 422 of the push rod 42 by means of the elastic member 46. The pushing part 422 moves to the left under the drive of the elastic member 46. The pushing part 422 no longer provides the parking pawl 20 with a pushing force to overcome the position restoring member 24. The position restoring force of the position restoring member 24 acts on the parking pawl 20, so that the parking pawl 20 rotates in the counterclockwise direction as indicated by the arrow in the drawing until the engagement part 22 of the parking pawl 20 is disengaged from the parking gear 10 as shown in FIG. 3. In this way, the parking state is released.

It should be noted that during the parking process, when the pushing part 422 pushes the parking pawl 20 to rotate toward the parking position, there is a possibility that the engagement cannot be achieved, as shown in FIG. 5. If the engagement end 22 of the parking pawl 20 is just opposite to a tooth of the parking gear and cannot be engaged between two teeth, the engagement cannot be achieved. At this moment, since the parking pawl 20 cannot rotate clockwise, it will also correspondingly prevent the pushing part 422 from moving to the right. Therefore, after the swinging drive member 50 drives the push block 44 to swing to the right, it will press the elastic member 46 as shown in the drawing, so that the elastic member 46 is compressed and deformed to store energy. When the internal system of the vehicle finds that the swinging drive member 50 has moved, but the parking pawl 22 did not move, it is judged that the failure of engagement has occurred. At this moment, the parking gear is controlled to rotate slightly. Once the engagement end 22 of the parking pawl 20 is located between two teeth and can be engaged, the elastic member 46 will release energy to push the pushing part 422 and the parking pawl 20 to achieve the parking state, as shown in FIG. 4.

The parking device of a vehicle has a simple structure. It cleverly utilizes the cooperation among components to drive the push rod by using a swinging drive method. It occupies a small space and has a compact structure. It can ensure the accuracy of the parking operation, good durability, and high stability.

In the embodiment shown in FIGS. 1 to 5, the pushing part 422 of the push rod 42 further comprises a push bracket 423, a first roller 425 and a second roller 426. The first roller 425 and the second roller 426 are rotatably provided on the push bracket 423, the first roller 425 can abut against the position limiting member 30, and the second roller 426 can abut against the parking pawl 20. By providing the two rollers, the contact of the pushing part 422 with the position limiting member 30 and the parking pawl 20 becomes a rolling contact, which can effectively reduce the wear loss of parts during the transmission process. Especially in the swinging drive method, the pushing part 422 will rotate to a certain extent relative to the position limiting member 30 and the parking pawl 20, and the roller design can make the entire transmission action smoother.

In the embodiment shown in FIGS. 1 to 5, the position limiting member 30 is further provided with two first limiting parts 34 that are provided with an interval. The push bracket 423 is provided with a second limiting part 424, which can be located between the two first limiting parts 34, and can abut against either of the first limiting part 34 along the moving direction after moving with the push bracket 423. Namely, as shown in FIG. 3, when the push bracket 423 moves to the left, the first limiting part 34 on the left can abut against the second limiting part 424 to prevent the second limiting part 424 and the push bracket 423 from further moving to the left. As shown in FIG. 4, when the push bracket 423 moves to the right, the first limiting part 34 on the right can abut against the second limiting part 424 to prevent the second limiting part 424 and the push bracket 423 from further moving to the right. The first limiting parts 34 and the second limiting part 424 can effectively limit the positional relationship between the pushing part 422 and the limiting member 30, thereby making the overall structure more stable.

In the embodiment shown in FIGS. 1 and 2, the push block 44 is a sliding sleeve sleeved on the push rod 42, and an outer surface of the push block 44 is provided with a pair of hinged parts 442 that are provided on opposite sides. The swinging drive member 50 comprises a pair of swinging parts 52 that are provided with an interval, and the swinging ends 54 of the pair of swinging parts 52 correspond to the pair of hinged parts 442 respectively, and can be hinged to the push block 44 through the hinged parts 442. The above connection relationship between the swinging drive member 50 and the push block 44 is more stable and effective.

Figure 6:
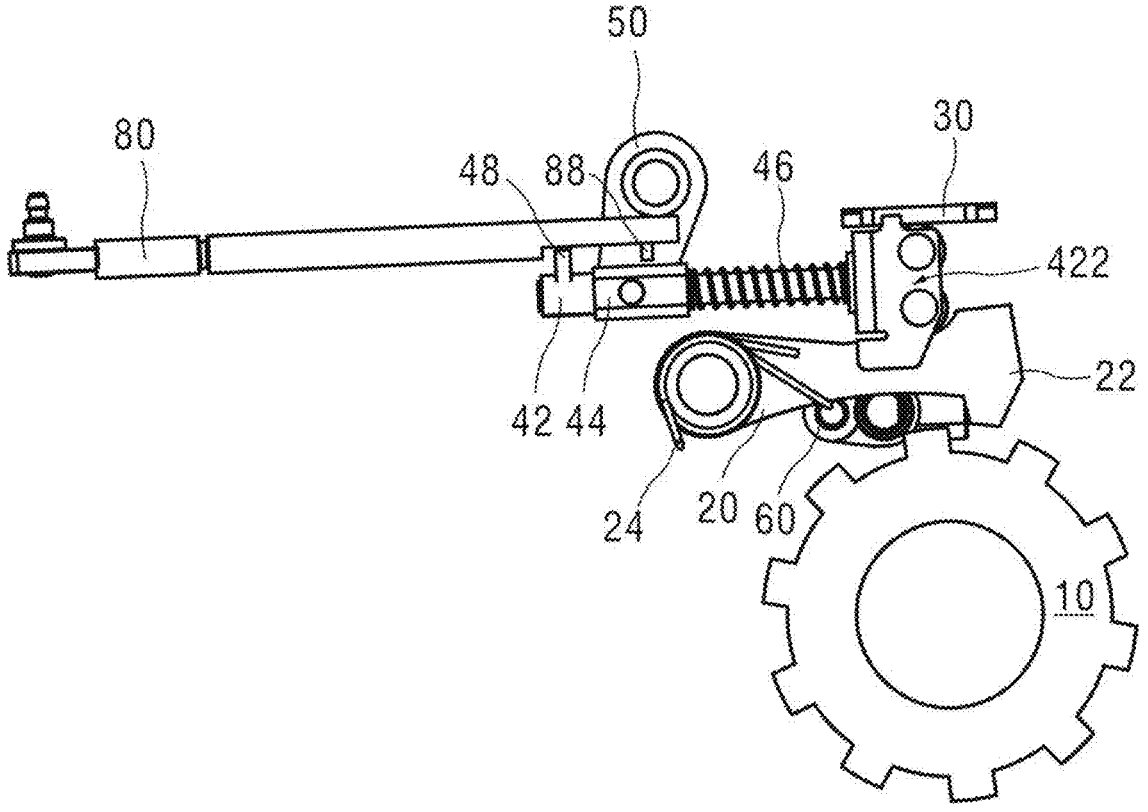
FIGS. 6 to 8 are schematic diagrams for illustrating the structure and the working state of the parking device according to another exemplary embodiment.
Figure 7:
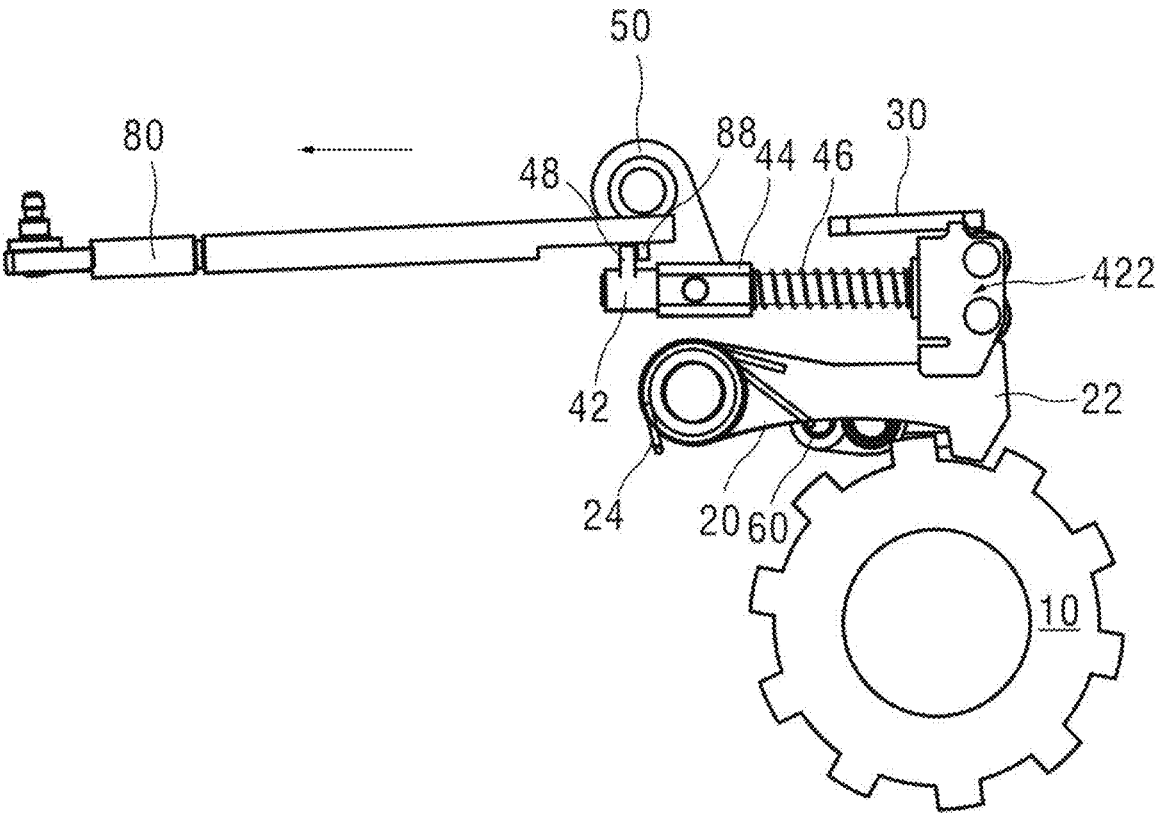
Figure 8:
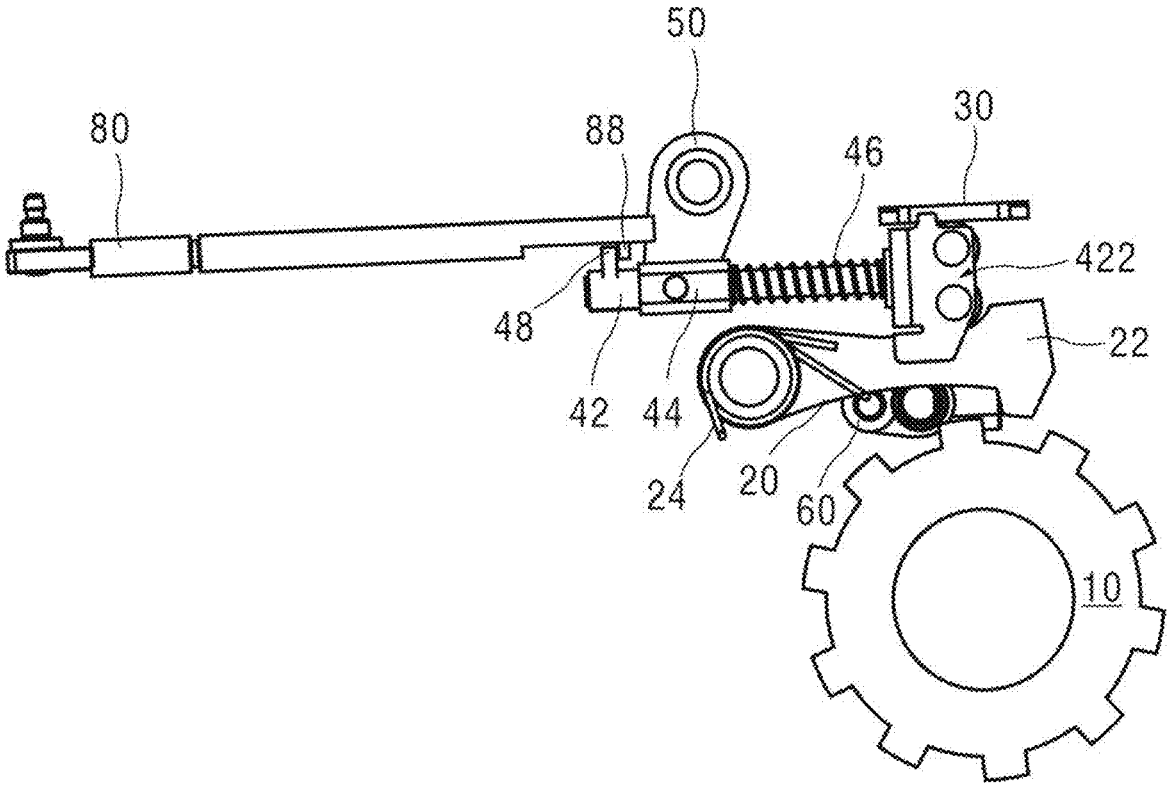

FIGS. 6 to 8 are schematic diagrams for illustrating the structure of a parking device according to another exemplary embodiment. As shown in FIGS. 6 to 8, the push rod 42 is further provided with an unlocking part 48. The parking device further comprises a manual pull rod 80, the manual pull rod 80 is provided with a pulling part 88, and the manual pull rod 80 can pull the unlocking part 48 through the pulling part 88 to pull the pushing part 422.

As shown in FIG. 6, the vehicle is in a normal driving state, the parking pawl 20 has not reached its parking position, and the parking gear 10 can rotate with the transmission system in the vehicle. This state is similar to FIG. 3 and will not be repeatedly described here. At this moment, there is no interaction between the pulling part 88 of the manual pull rod 80 and the unlocking part 48 of the push rod 42.

When the vehicle needs to park, as shown in FIG. 7, the parking pawl 20 reaches its parking position and engages with the parking gear 10 to stop the parking gear 10 from rotating. This state is similar to FIG. 4 and will not be repeatedly described here. At this moment, the unlocking part 48 of the push rod 42 moves with the push rod 42 to the right side of the drawing. At this position, there is no interaction between the pulling part 88 of the manual pull rod 80 and the unlocking part 48 of the push rod 42.

If the rotation drive device 70 of the parking device (see FIG. 9) works normally, it can achieve switching between the two states of FIG. 6 and FIG. 7 by driving the swinging drive member 50 to swing. However, if in the state shown in FIG. 7, the rotation drive device 70 of the parking device (see FIG. 9) fails to work, and the swinging drive member 50 cannot swing, in order to unlock the parking state, the manual pull rod 80 can be pulled to the left side of the drawing along the direction indicated by the arrow in the drawing, and the pulling part 88 of the manual pull rod 80 can pull the unlocking part 48 of the push rod 42 to the left, thereby driving the push rod 42 and its pushing part 422 to move to the left side of the drawing, and the pushing part 422 no longer provides the parking pawl 20 with a pushing force to overcome the position restoring member 24. The position restoring force of the position restoring member 24 will act on the parking pawl 20, so that the parking pawl 20 rotates counterclockwise until the engagement part 22 of the parking pawl 20 is disengaged from the parking gear 10, thereby unlocking the parking state.

The manual pull rod 80 can be extended into the cab, so that the driver can manually unlock the parking state by pulling the manual pull rod 80 when the vehicle has a parking failure.

The present disclosure also provides a parking system of a vehicle, which comprises the parking device and a rotation drive device 70, as shown in FIG. 9. The rotation drive device 70 can provide a driving force for the swinging drive member 50, so as to control the parking device to switch between the parking state and the parking unlocking state.

In the embodiment shown in FIG. 9, the parking system further comprises a rotation position sensor (not shown in the drawing) provided in the rotation drive device 70, and a pawl position sensor 60 for detecting the position of the parking pawl. By providing the two position sensors, the current work state of the parking device can be accurately obtained to improve the safety level.

The present disclosure also provides a vehicle having the parking system.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

What is claimed is:

1. A parking device of a vehicle, comprising:
   a parking gear, which is linked to a transmission system of the vehicle;
   a position limiting member, which is fixedly provided in the vehicle and spaced from a circumferential side surface of the parking gear;
   a parking pawl, which is provided in the vehicle in a way that it is rotatable around a fixed axis, and an engagement end of the parking pawl is located between the position limiting member and the parking gear, and is rotatable to a parking position where it is engaged with the parking gear;
   a push rod assembly which comprises:
      a push rod, which is provided with a pushing part that can abut between the parking pawl and the position limiting member,
      a push block, which is slidably provided on the push rod, and
      an elastic member, which is connected between the pushing part and the push block;
   a swinging drive member, which is capable of swinging back and forth around a swinging axis, a swinging end of the swinging drive member can be hinged to the push block to push or pull, via the push block, the pushing part to move by means of the elastic member, and by pushing the pushing part the parking pawl can be driven to rotate so that the engagement end is rotated to the parking position; and
   a position restoring member, which is capable of providing a position restoring force to the parking pawl, so that the engagement end can be disengaged from the parking position after the pushing part is pulled,
   the push block is a sliding sleeve slidably sleeved on the push rod, and an outer surface of the push block is provided with a pair of hinged parts that are provided on opposite sides;
   the swinging drive member comprises a pair of swinging parts, and a swinging end of each of the pair of swinging parts can be hinged respectively to radially opposite sides of the push block through one of the hinged parts,
   wherein the parking device is configured such that when the parking is to be released, the swinging drive member drives the push block to swing, and the push block pulls the pushing part of the push rod by means of the elastic member, so that the position restoring force of the position restoring member acts on the parking pawl.

2. The parking device according to claim 1, wherein the pushing part comprises a push bracket, and a first roller and a second roller that are rotatably provided on the push bracket, the first roller is capable of abutting against the position limiting member, and the second roller is capable of abutting against the parking pawl.

3. The parking device according to claim 2, wherein the position limiting member is provided with two first limiting parts that are provided with an interval; and the pushing bracket is provided with a second limiting part, the second limiting part is capable of being located between the two first limiting parts and is capable of abutting against either of the first limiting parts along a moving direction after moving with the pushing bracket.

4. A parking system of a vehicle, comprising:

the parking device according to claim 3, and a rotation drive device, which is capable of providing a driving force for the swinging drive member.

5. A parking system of a vehicle, comprising:

the parking device according to claim 2, and a rotation drive device, which is capable of providing a driving force for the swinging drive member.

6. The parking device according to claim 1, wherein the elastic member is a spring sleeved on the push rod.

7. A parking system of a vehicle, comprising:

the parking device according to claim 6, and a rotation drive device, which is capable of providing a driving force for the swinging drive member.

8. The parking device according to claim 1, wherein the push rod is further provided with an unlocking part; and the parking device further comprises a manual pull rod, the manual pull rod is provided with a pulling part, and the manual pull rod can pull the unlocking part through the pulling part to pull the pushing part.

9. A parking system of a vehicle, comprising:

the parking device according to claim 8, and a rotation drive device, which is capable of providing a driving force for the swinging drive member.

10. A parking system of a vehicle, comprising:

the parking device according to claim 1, and a rotation drive device, which is capable of providing a driving force for the swinging drive member.

11. A parking system as claimed in claim 10, further comprising:

a rotating position sensor disposed in the rotation drive device; and a pawl position sensor for detecting a position of the parking pawl.

12. A vehicle comprising the parking system according to claim 11.

13. A vehicle comprising the parking system according to claim 10.

\* \* \* \* \*